United States Patent
Moradi Pari

(10) Patent No.: US 11,410,471 B2
(45) Date of Patent: Aug. 9, 2022

(54) SYSTEMS AND METHODS FOR PROVIDING A DATA FLOW FOR SENSOR SHARING

(71) Applicant: Honda Motor Co., Ltd., Tokyo (JP)

(72) Inventor: Ehsan Moradi Pari, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 16/548,794

(22) Filed: Aug. 22, 2019

(65) Prior Publication Data
US 2021/0056770 A1    Feb. 25, 2021

(51) Int. Cl.
| | |
|---|---|
| G07C 5/00 | (2006.01) |
| H04B 7/0426 | (2017.01) |
| H04B 7/06 | (2006.01) |
| H04W 4/80 | (2018.01) |
| H04B 1/3822 | (2015.01) |

(Continued)

(52) U.S. Cl.
CPC ............ G07C 5/008 (2013.01); H04B 1/3822 (2013.01); H04B 1/713 (2013.01); H04B 7/043 (2013.01); H04B 7/0626 (2013.01); H04W 4/80 (2018.02); H04W 84/18 (2013.01)

(58) Field of Classification Search
CPC ...... G07C 5/008; H04B 7/043; H04B 7/0626; H04B 1/3822; H04B 1/713; H04W 4/80; H04W 84/18
See application file for complete search history.

(56) References Cited

U.S. PATENT DOCUMENTS

| | | |
|---|---|---|
| 9,008,906 B2 | 4/2015 | Ricci |
| 9,216,745 B2 | 12/2015 | Beardsley et al. |
| 9,261,882 B2 | 2/2016 | Kim et al. |

(Continued)

FOREIGN PATENT DOCUMENTS

| | | | |
|---|---|---|---|
| CN | 107274699 | 10/2017 | |
| WO | WO2016159712 | 10/2016 | |
| WO | WO-2018064179 A1 * | 4/2018 | ........... H04B 7/0617 |

OTHER PUBLICATIONS

Hu et al., "Vehicular Multi-Access Edge Computing With Licensed Sub-6 GHz, IEEE 802,11p and mmWave" [online], Feb. 14, 2018 [retrieved on Oct. 26, 2020]. Retrieved from the Internet: <URL: https://ieeexplore.ieee.org/stamp/stamp.jsp?arnumber=8170212>. Section I, para 2, Section 3, para 1.

(Continued)

*Primary Examiner* — Jaime M Holliday
(74) *Attorney, Agent, or Firm* — Rankin, Hill & Clark LLP

(57) ABSTRACT

Systems and methods for providing a data flow for sensor sharing are described. According to one embodiment, an apparatus configured to be employed in a host vehicle includes a memory and a processor. The processor includes a receiving module, a metadata module, a packet module, and a transmission module. The receiving module is configured to receive sensor data from at least one vehicle sensor of the host vehicle. The metadata module is configured to generate metadata for sensor data. The packet module is configured to form a metadata packet including the metadata and a sensor data packet including the sensor data. The transmission module is configured to transmit the metadata packet at a first carrier frequency and the sensor data packet at a second carrier frequency that is different than the first carrier frequency.

19 Claims, 9 Drawing Sheets

(51) Int. Cl.
*H04W 84/18* (2009.01)
*H04B 1/713* (2011.01)

(56) References Cited

U.S. PATENT DOCUMENTS

| | | | |
|---|---|---|---|
| 9,547,989 B2 | 1/2017 | Fairfield et al. | |
| 2014/0094210 A1 | 4/2014 | Gellens et al. | |
| 2014/0361906 A1* | 12/2014 | Hughes | H04Q 9/00 |
| | | | 340/870.01 |
| 2015/0373583 A1 | 12/2015 | Yousefi et al. | |
| 2016/0277513 A1 | 9/2016 | Kim et al. | |
| 2016/0280160 A1 | 9/2016 | MacNeille et al. | |
| 2016/0295624 A1 | 10/2016 | Novlan et al. | |
| 2016/0349365 A1* | 12/2016 | Ling | G01S 7/2813 |
| 2018/0042028 A1 | 2/2018 | Nam et al. | |
| 2020/0053524 A1* | 2/2020 | Novlan | H04W 4/40 |
| 2020/0137535 A1* | 4/2020 | Hoffner | G06K 9/00791 |
| 2020/0166388 A1* | 5/2020 | Naito | H04Q 9/00 |

OTHER PUBLICATIONS

International Search Report and Written Opinion of PCT/US2020/046364 dated Nov. 3, 2020, 11 pages.

Cheng, Xiang, et al. "5G-enabled cooperative intelligent vehicular (5GenCIV) framework: When Benz meets Marconi." IEEE Intelligent Systems 32.3 (2017): 53-59.

Campolo, Claudia, et al. "5G network slicing for vehicle-to-everything services." IEEE Wireless Communications 24.6 (2017): 38-45.

Han, Qilong, Shuang Liang, and Hongli Zhang. "Mobile cloud sensing, big data, and 5G networks make an intelligent and smart world." IEEE Network 29.2 (2015): 40-45.

Jo, Kichun, et al. "Development of autonomous car—Part I: Distributed system architecture and development process." IEEE Transactions on Industrial Electronics 61.12 (2014): 7131-7140.

Jo, Kichun, et al. "Development of autonomous car—Part II: A case study on the implementation of an autonomous driving system based on distributed architecture." IEEE Transactions on Industrial Electronics 62.8 (2015): 5119-5132.

Festag, Andreas. "Standards for vehicular communication—from IEEE 802.11 p to 5G." e & i Elektrotechnik und Informationstechnik 132.7 (2015): 409-416.

* cited by examiner

SYSTEMS AND METHODS FOR PROVIDING A DATA FLOW FOR SENSOR SHARING

BACKGROUND

Different services and applications have diverse network requirements and limitations. In general, 5G could evolve based on 3GPP long term evolution (LTE) advanced (LTE-Adv) with additional potential new Radio Access Technologies (RATs) to enrich people lives with better, simple and seamless wireless connectivity solutions. However, while these technologies provide high throughput capabilities, they suffer in high mobility scenarios, such as vehicle communication.

BRIEF DESCRIPTION

According to one aspect, an apparatus configured to be employed in a host vehicle includes a memory and a processor. The processor includes a receiving module, a metadata module, a packet module, and a transmission module. The receiving module is configured to receive sensor data from at least one vehicle sensor of the host vehicle. The metadata module is configured to generate metadata for sensor data. The packet module is configured to form a metadata packet including the metadata and a sensor data packet including the sensor data. The transmission module is configured to transmit the metadata packet at a first carrier frequency and the sensor data packet at a second carrier frequency that is different than the first carrier frequency.

According to another aspect, a computer-implemented method for providing a data flow for sensor sharing. The method includes receiving sensor data from at least one vehicle sensor of the host vehicle. The method further includes generating metadata for sensor data. The method also includes forming a metadata packet including the metadata and a sensor data packet including the sensor data. The method includes transmitting the metadata packet at a first carrier frequency and the sensor data packet at a second carrier frequency that is different than the first carrier frequency.

According to yet another aspect, an apparatus configured to be employed in a host vehicle includes a memory and a processor. The processor includes a receiving module, a metadata module, a packet module, and a transmission module. The receiving module is configured to receive sensor data from at least one vehicle sensor of the host vehicle. The metadata module is configured to generate metadata for sensor data. The packet module is configured to form a metadata packet including the metadata and a sensor data packet including the sensor data. The transmission module is configured to transmit the metadata packet at a first carrier frequency and the sensor data packet at a second carrier frequency that is different spectra than the first carrier frequency of a fifth generation (5G) associated spectra.

DETAILED DESCRIPTION

Figure 1:
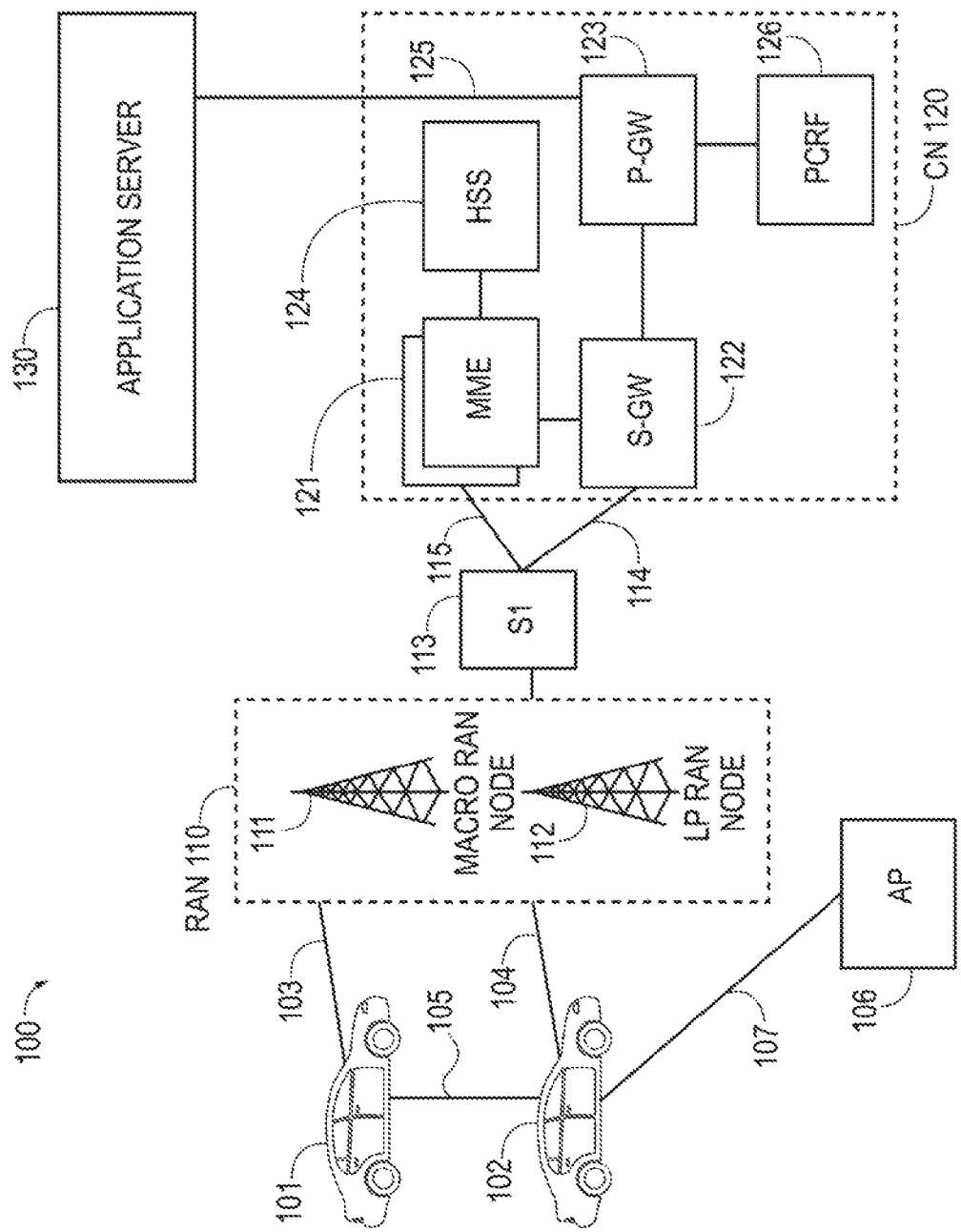
FIG. 1 is a block diagram illustrating an example network system with vehicles, and eNB/gNB in a core network useable in connection with various aspects described herein.

To take advantage of low frequency communication but achieve high throughput and long-range communication, the systems and method described herein leverage directional beaming. For example, a base station may advertise that it is participating in large-scale sensor sharing. Vehicles can confirm their capability to participate in the sensor sharing as well as location and path prediction information such as navigation, trajectories, and/or vectoring data. The base station can then determine time, frequency, and/or beam training information to share. For example, the base station may indicate a specific frequency for communication to the vehicle at a given time.

Using the communication parameters set by the base station, proximate vehicles to the base station can communicate with one another. Communication between vehicles, including a host vehicle and a remote vehicle, may be facilitated by a fifth-generation cellular network (5G) technology. For example, the raw data from the host vehicle may be processed, analyzed, or used by the remote vehicle. Accordingly, the host vehicle may transmit raw sensor data as well as the metadata needed to process the sensor data of the host vehicle. The different types of data are sent using different networks. For example, the raw sensor data may be sent using mmWave, while the metadata is may be sent using sub-6 GHz. Thus, the systems and methods herein may use 5G new radio (NR) systems operating in different spectrums, such as in both the sub-6 GHz spectrum and the mmWave based on the type of data being sent.

The remote vehicle can then perform sensor fusion to determine the correspondence between the received sensor data and metadata. Furthermore, the remote vehicle may use the metadata to authenticate the sensor data. In another embodiment, previously received metadata may be used to authenticate and analyze incoming sensor data from the host vehicle. Accordingly, the metadata can be used to identify and secure communications between the host vehicle and the remote vehicle.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR- RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, buildings, landmarks, obstructions in the roadway, road segments, intersections, etc. Thus, obstacles may be identified, detected, or associated with a path along a route on which a vehicle is travelling or is projected to travel along.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. Systems Overview

Referring now to the drawings, the drawings are for purposes of illustrating one or more exemplary embodiments and not for purposes of limiting the same. FIG. 1 is an exemplary component diagram of an operating environment FIG. 1 illustrates a network architecture 100 of a network in accordance with some embodiments. The network architecture 100 is shown to include a first vehicle 101 and a second vehicle 102. The vehicles 101 and 102 are illustrated as vehicles but can also comprise other forms of user equipment (UE) such as smartphones (e.g., handheld touchscreen mobile computing devices connectable to one or more cellular networks), or any mobile or non-mobile computing device, such as Personal Data Assistants (PDAs), pagers, laptop computers, desktop computers, wireless handsets, or any computing device including a wireless communications interface.

In some embodiments, any of the vehicles 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTG) for exchanging data with an MTG server or device via a public land mobile network (PLMN), Proximity-Based Service (ProSe) or device-to-device communication, sensor networks, or IoT networks. The M2M or MTG exchange of data can be a machine-initiated exchange of data. An IoT network describes interconnecting IoT vehicles, which can include uniquely identifiable embedded computing devices (within the Internet infrastructure), with short-lived connections. The IoT vehicles can execute background applications (e.g., keep-alive messages, status updates, etc.) to facilitate the connections of the IoT network.

The vehicles 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The vehicles 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the vehicles 101 and 102 can further directly exchange communication data via a Prose interface 105. The Prose interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The second vehicle 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the vehicles 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the vehicles 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the vehicles 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (POSCH) can carry user data and higher-layer signaling to the vehicles 101 and 102. The physical downlink control channel (PDCCH) can carry information about the transport format and resource allocations related to the POSCH channel, among other things. It can also inform the vehicles 101 and 102 about the transport format, resource allocation, and H-ARQ (Hybrid Automatic Repeat Request) information related to the uplink shared channel. Typically, downlink scheduling (assigning control and shared channel resource blocks to the second vehicle 102 within a cell) can be performed at any of the RAN nodes 111 and 112 based on channel quality information fed back from any of the vehicles 101 and 102. The downlink resource assignment information can be sent on the POCCH used for (e.g., assigned to) each of the vehicles 101 and 102.

The POCCH can use control channel elements (CCEs) to convey the control information. Before being mapped to resource elements, the POCCH complex-valued symbols can first be organized into quadruplets, which can then be permuted using a sub-block interleaver for rate matching. Each POCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The POCCH can be transmitted using one or more CCEs, depending on the size of the downlink control information (OCI) and the channel condition. There can be four or more different POCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPOCCH) that uses POSCH resources for control information transmission. The EPOCCH can be transmitted using one or more enhanced the control channel elements (ECCEs). Similar to above, each EGGE can correspond to nine sets of four physical resource elements known as an enhanced resource element groups (EREGs). An EGGE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PON) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming and/or addressing resolution, location dependencies, etc.

The S-GW 122 can terminate the S 1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PON. The P-GW 123 can route data packets between the EPC network and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the vehicles 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
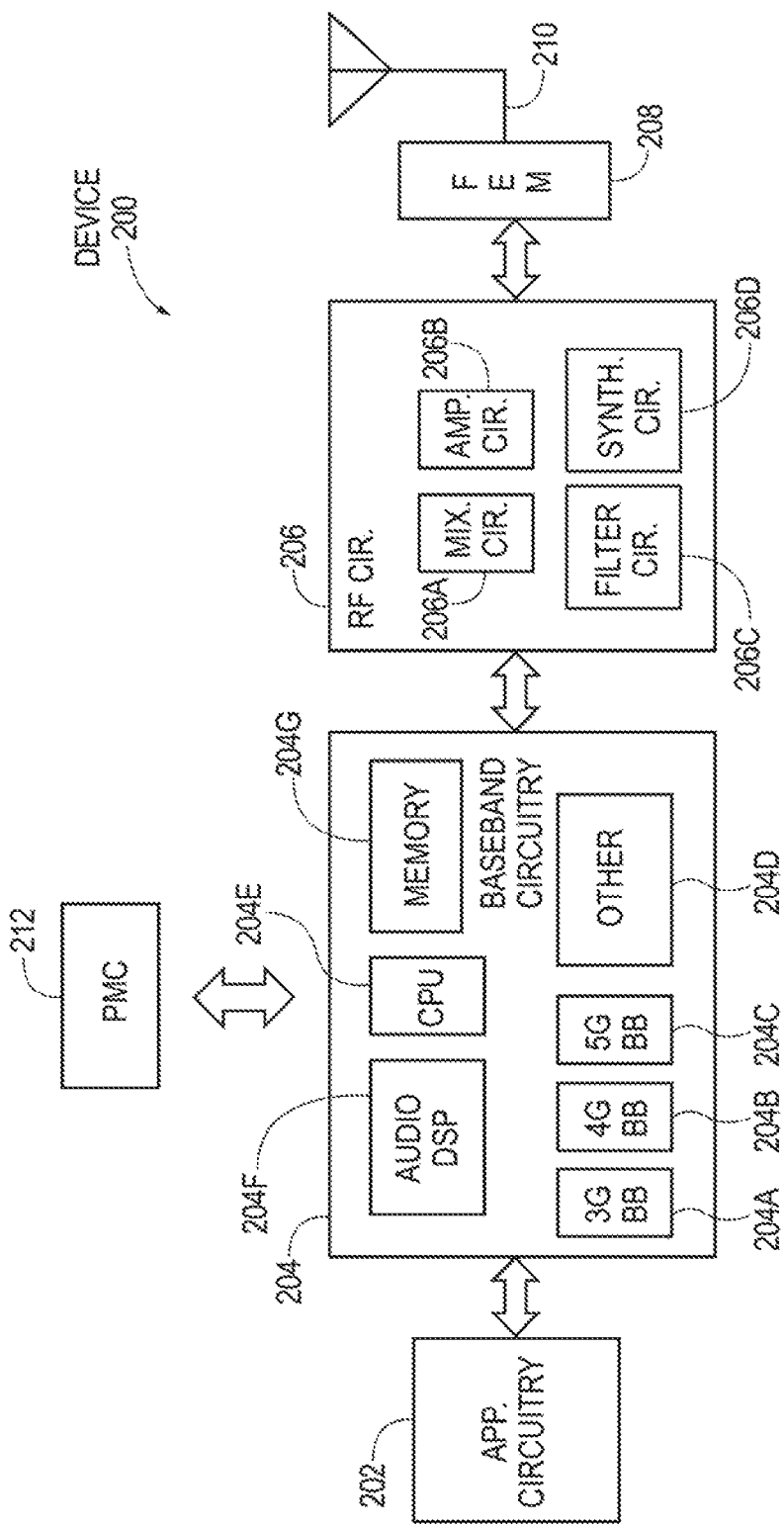
FIG. 2 is a diagram illustrating example components of a network device as a vehicle or eNB/gNB that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. The baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation and/or demodulation circuitry of the baseband circuitry 204 may include Fast-Fourier Transform (FFT), precoding, or constellation mapping and/or demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation and/or demodulation and encoder and/or decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression and/or decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature down-conversion and up-conversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct down-conversion and direct up-conversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAG) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage-controlled oscillator (VCO), although that is not a requirement. Divider control input may be provided by either the baseband circuitry 204 or the application circuitry 202 depending on the desired output frequency. In some embodiments, a divider control input (e.g., N) may be determined from a look-up table based on a channel indicated by the application circuitry 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a 0-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM circuitry 208, or in both the RF circuitry 206 and the FEM circuitry 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM circuitry 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the baseband circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
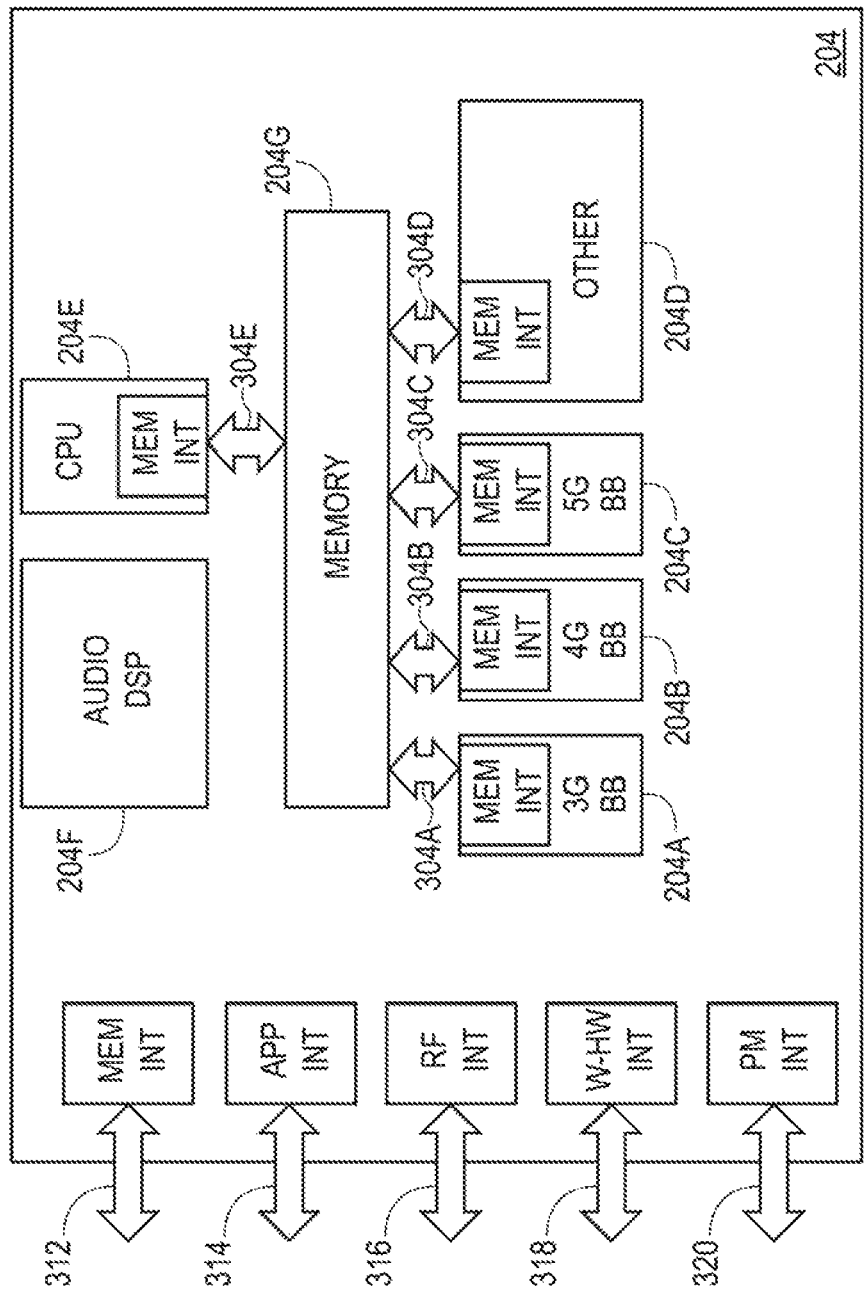
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed above the user equipment may include vehicles such as the first vehicle 101 and the second vehicle 102, shown in FIG. 1. The vehicles, have an operating environment that allows them to provide a data flow to one another and other vehicles for sensor sharing. A host vehicle 400, as used herein, refers to a vehicle employing at least a portion of the operating environment. Accordingly, either the first vehicle 101 or the second vehicle 102 can act as a host vehicle 400 with respect to the operating environment shown in FIG. 4.

Figure 4:
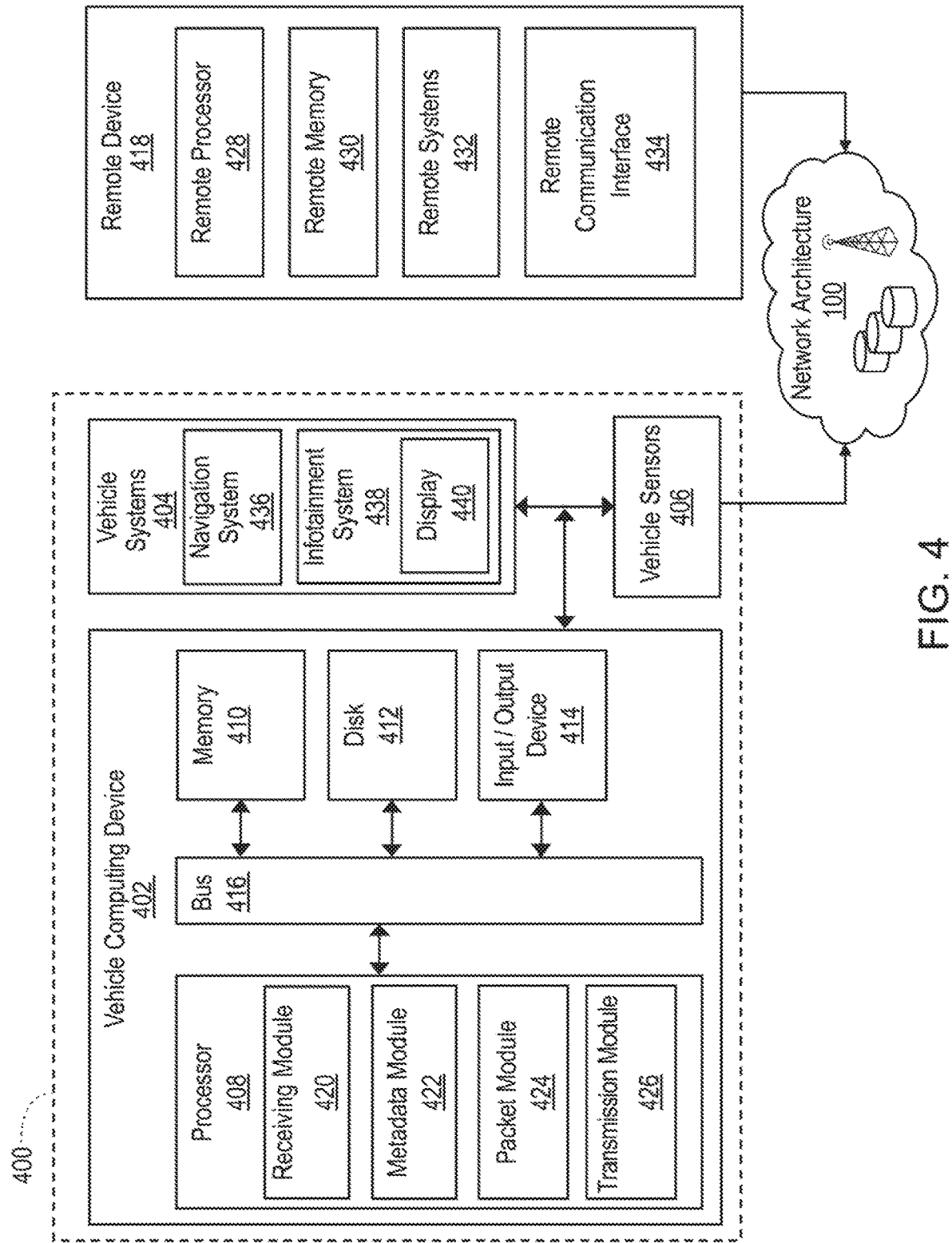
FIG. 4 is a block diagram illustrating a system for providing a data flow for sensor sharing employable at a vehicle, according to various aspects described herein.

In FIG. 4, the host vehicle 400 includes a vehicle computing device (VCD) 402, vehicle systems 404, and vehicle sensors 406. Generally, the VCD 402 includes a processor 408, a memory 410, a disk 412, and an input/output (I/O) device 414, which are each operably connected for computer communication via a bus 416 and/or other wired and wireless technologies defined herein. The VCD 402 includes provisions for processing, communicating, and interacting with various components of the host vehicle and other components of the operating environment, including other vehicles.

In one embodiment, the VCD 402 can be implemented with the host vehicle, for example, as part of a telematics unit, a head unit, an infotainment unit, an electronic control unit, an on-board unit, or as part of a specific vehicle control system, among others. In other embodiments, the VCD 402 can be implemented remotely from the host vehicle, for example, with a portable device (not shown), a remote device (not shown), or the remote server 418, connected via the network architecture 100.

The processor 408 can include processing/logic circuitry with hardware, firmware, and software architecture frameworks for facilitating shared autonomy through cooperative autonomy and control of the host vehicle 400 and/or a remote vehicle. For example, the first vehicle 101 may be the host vehicle 400, the second vehicle 102 is a remote vehicle. In other embodiments, the second vehicle 102 may be a number of remote vehicles.

The processor 408 can store application frameworks, kernels, libraries, drivers, application program interfaces, among others, to execute and control hardware and functions discussed herein. For example, the processor 408 can include a receiving module 420, a metadata module 422, a packet module 424, and a transmission module 426, although the processor 408 can be configured into other architectures. Further, in some embodiments, the memory 410 and/or the disk 412 can store similar components as the processor 408 for execution by the processor 408.

The I/O device 414 can include software and hardware to facilitate data input and output between the components of the VCD 402 and other components of the operating environment. Specifically, the I/O device 414 can include network interface controllers (not shown) and other hardware and software that manages and/or monitors connections and controls bi-directional data transfer between the I/O device 414 and other components of the operating environment using, for example, the network architecture 100.

As mentioned above, in some embodiments, data transmission can be executed at and/or with other infrastructures and servers, as described above. For example, the VCD 402 can transmit and receive information, such as roadway data or vehicle data, directly or indirectly to and from the remote server 418 using the network architecture. The remote server 418 can include a remote processor 428, a remote memory 430, remote data 432, and a communication interface 434 that are configured to be in communication with one another. For example, the VCD 402 may receive and transmit information to and from the remote server 418 and other servers, processors, and information providers through the network architecture 100. The VCD 402 can receive and transmit information to and from the remote server 418 including, but not limited to, vehicle data, traffic data, road data, curb data, vehicle location and heading data, high-traffic event schedules, weather data, or other transport related data. In some embodiments, the remote server 418 can be linked to one or more vehicles, other entities, traffic infrastructures, and/or devices through the network architecture 100. In this manner, vehicles that are equipped for sensor sharing may communicate.

Referring again to the host vehicle 400, the vehicle systems 404 can include any type of vehicle control system and/or vehicle described herein to enhance the host vehicle and/or driving of the host vehicle. For example, the vehicle systems 404 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). As will be described, one or more of the vehicle systems 404 can be controlled according the systems and methods discussed herein. Here, the vehicle systems 404 include a navigation system 436 and an infotainment system 438. The navigation system 436 stores, calculates, and provides route and destination information and facilitates features like turn-by-turn directions. The infotainment system 438 provides visual information and/or entertainment to a vehicle occupant and can include a display 440.

The vehicle sensors 406, which can be implemented with the vehicle systems 404, can include various types of sensors for use with the host vehicle and/or the vehicle systems 404 for detecting and/or sensing a parameter of the host vehicle, the vehicle systems 404, and/or the environment surrounding the host vehicle. For example, the vehicle sensors 406 can provide data about vehicles and/or downstream objects in proximity to the host vehicle. For example, the vehicle sensors 406 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. The vehicle sensors 406 can be any type of sensor, for example, acoustic, electric, environmental, optical, imaging, light, pressure, force, thermal, temperature, proximity, among others.

Using the system and network configuration discussed above, cooperative autonomy and vehicle control can be provided based on real-time information from vehicles using vehicular communication of sensor data. Detailed embodiments describing exemplary methods using the system and network configuration discussed above, will now be discussed in detail.

Figure 5:
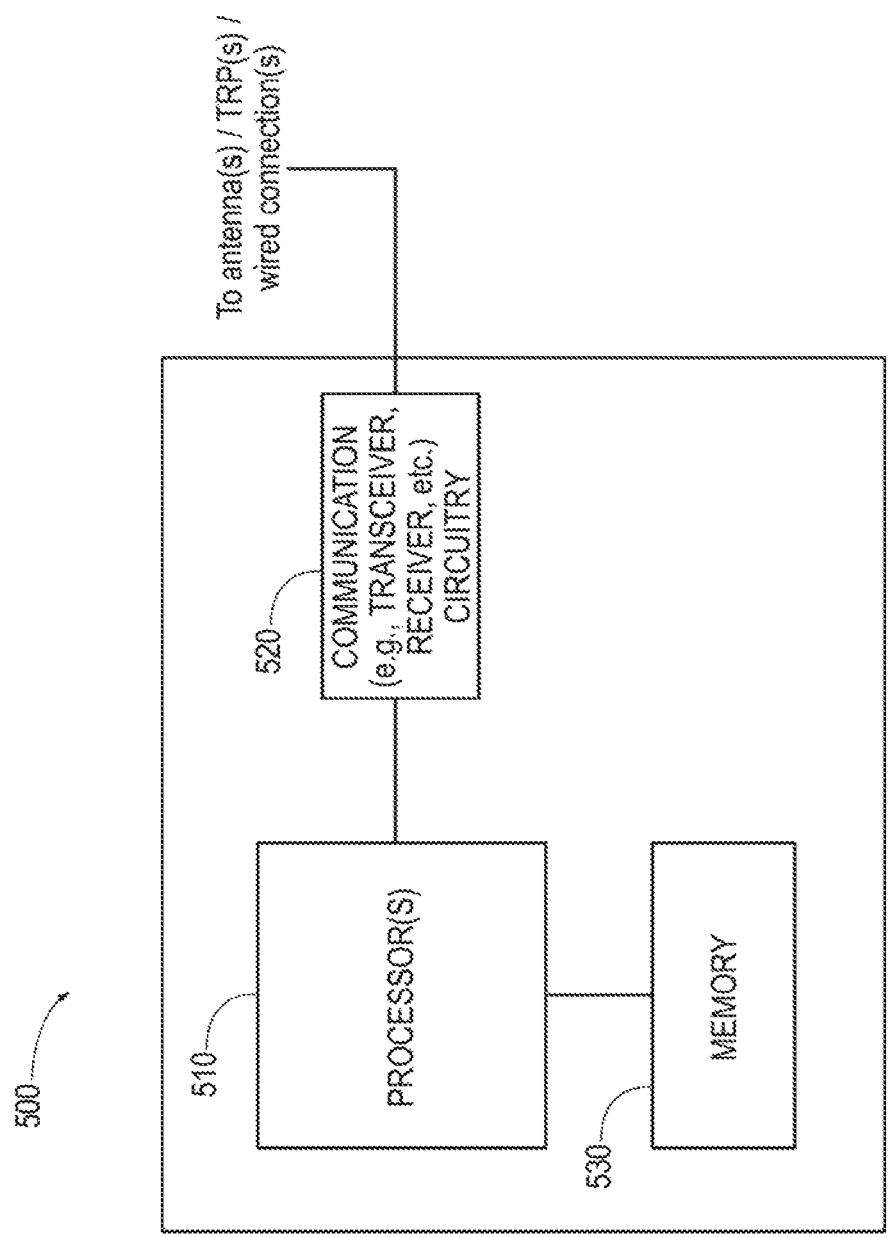
FIG. 5 is a block diagram illustrating a system employable at a base station (BS)/evolved NodeB (eNB)/new radio/next generation NodeB (gNB) that enables beam reporting and beam management procedures, according to various aspects described herein.

Referring to FIG. 5, illustrated is a block diagram of a system 500 employable at a BS (Base Station) that facilitates mapping of one or more codewords to one or more MIMO layers for 5G NR, according to various aspects described herein. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture.

II. Methods Overview

Figure 6:
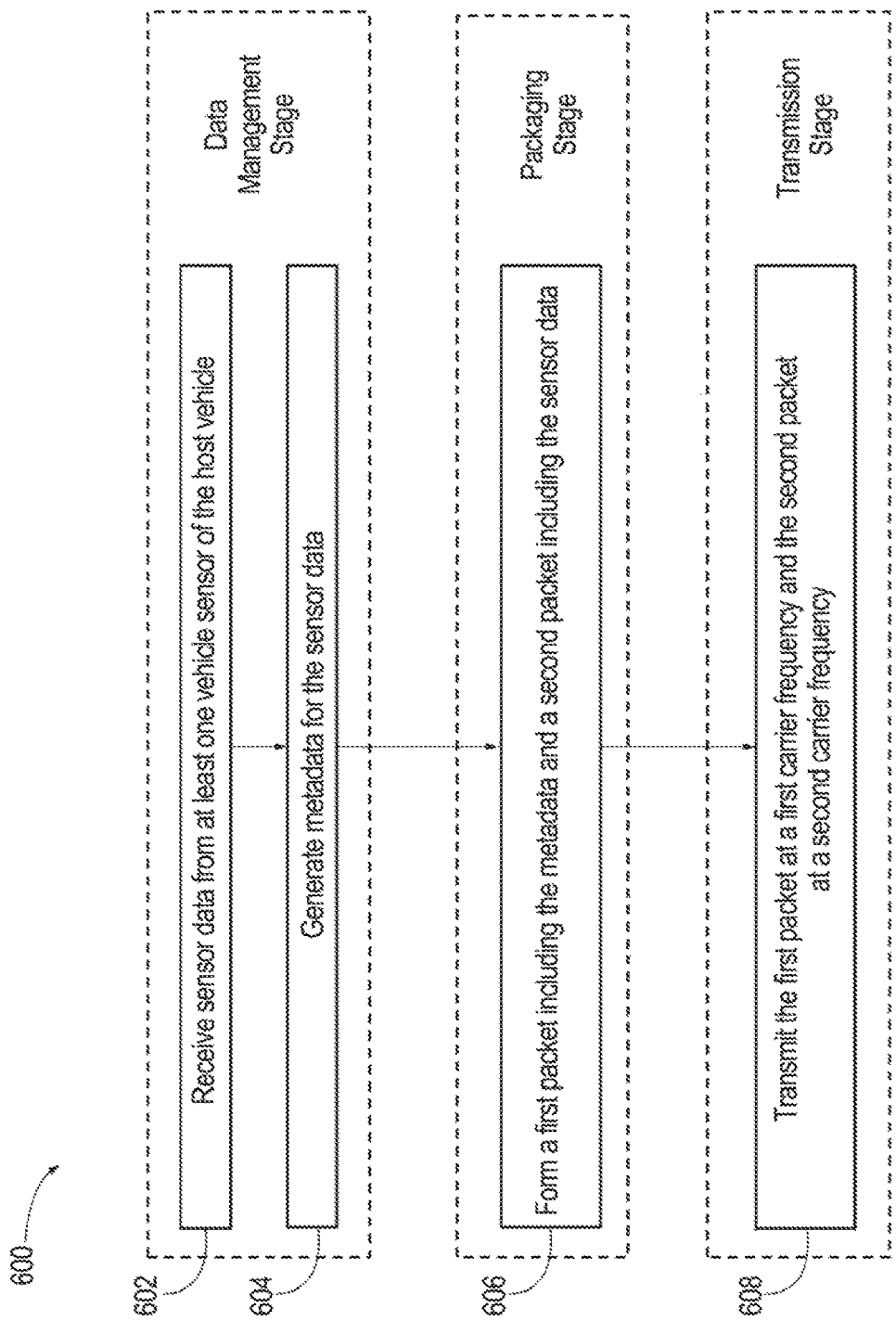
FIG. 6 is a flow diagram illustrating an example for providing a data flow for sensor sharing, according to various aspects described herein.
Figure 7:
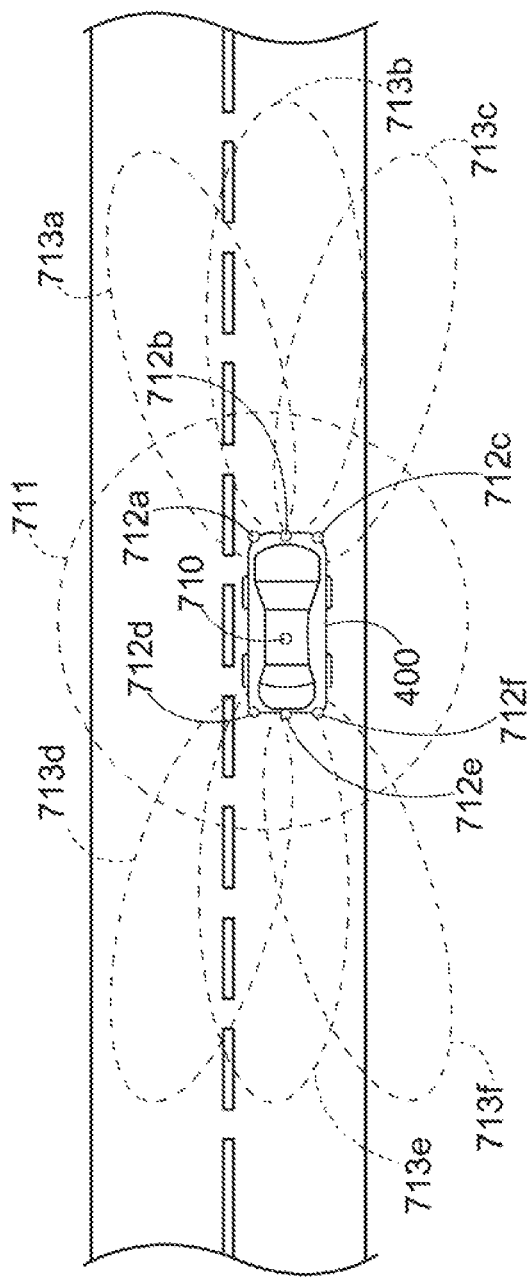
FIG. 7 is a schematic view of the sensing areas of the host vehicle on a roadway according to one embodiment.
Figure 8:
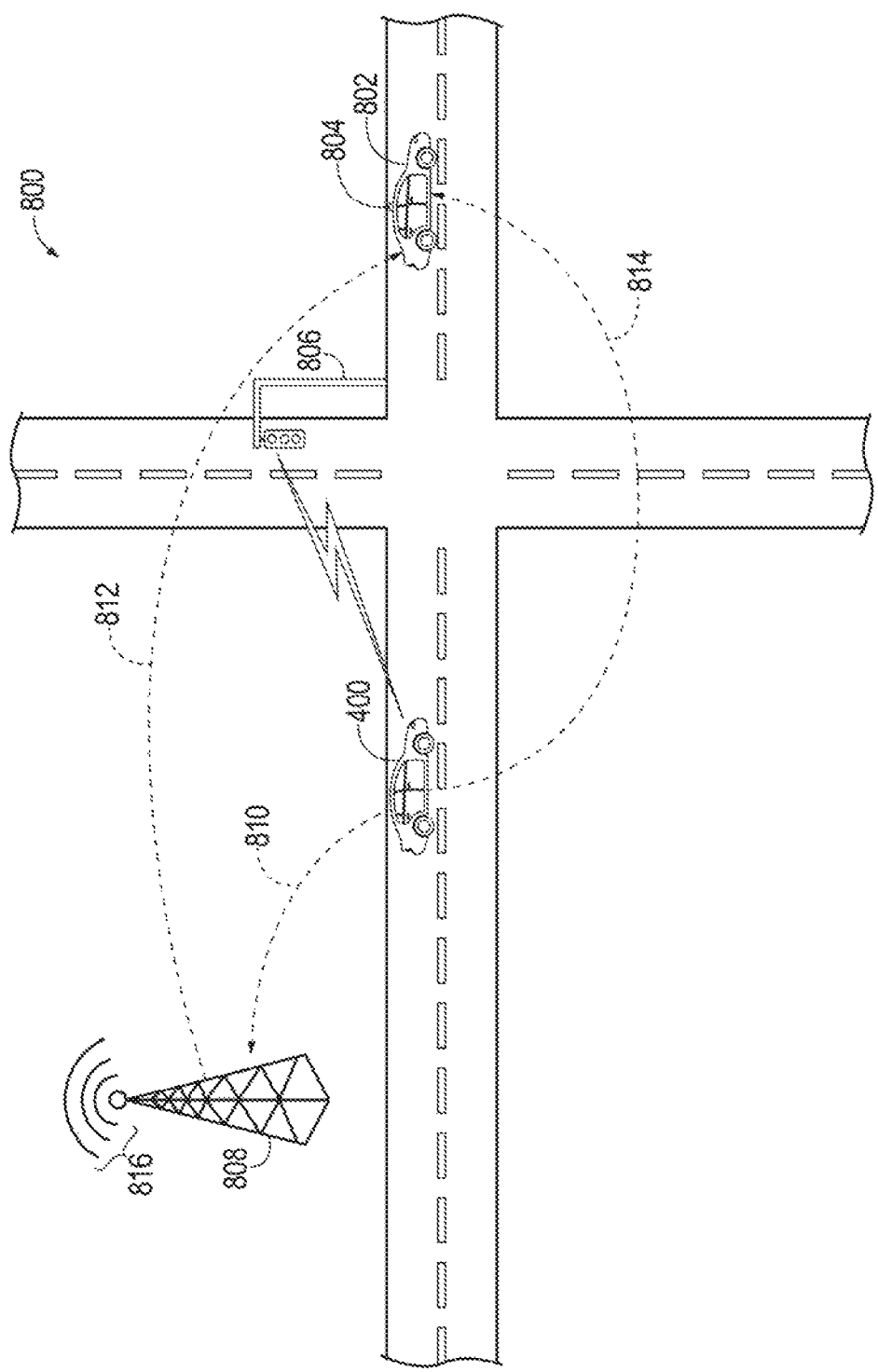
FIG. 8 is a schematic view of an exemplary traffic scenario on a roadway according to one embodiment.

Referring now to FIG. 6, a method 600 for providing a data flow for sensor sharing will now be described according to an exemplary embodiment. FIG. 6 will also be described with reference to FIGS. 1-5, 7, and 8. As shown in FIG. 6, the method for range prediction can be described by three stages, namely, (A) Data Management, (B) Packaging, and (C) Transmission stages. For simplicity, the method 600 will be described by these stages, but it is understood that the elements of the method 600 can be organized into different architectures, blocks, stages, and/or processes. For example, the reconstruction and prediction stages may be performed in parallel.

A. Data Management Stage

At block 602, the receiving module 420 receives sensor data from the vehicle sensors 406. The vehicle sensors 406 include at least one sensor for sensing objects and the surrounding environment around the host vehicle 400. In an exemplary embodiment, the surrounding environment of the host vehicle 400 may be defined as a predetermined area located around (e.g., ahead, to the side of, behind, above, below) the host vehicle 400 and includes a road environment in front, to the side, and/or behind of the host vehicle 400 that may be within the vehicle's path. For example, the vehicle sensors 406 may include a light sensor 710 for capturing sensor data in a light sensing area 711 and one or more host image sensors 712a, 712b, 712c, 712d, 712e, and 712f for capturing sensor data in corresponding image sensing areas 713a, 713b, 713c, 713d, 713e, and 713f.

The light sensor 710 may be used to capture light data in the light sensing area 711. The size of the light sensing area 711 may be defined by the location, range, sensitivity, and/or actuation of the light sensor 710. For example, the light sensor 710 may rotate 360 degrees around the host vehicle 400 and collect sensor data from the light sensing area 711 in sweeps. Conversely, the light sensor 710 may be omnidirectional and collect sensor data from all directions of the light sensing area 711 simultaneously. For example, the light sensor 710 emits one or more laser beams of ultraviolet, visible, or near infrared light in the light sensing area 711 to collect sensor data.

The light sensor 710 may be configured to receive one or more reflected laser waves (e.g., signals) that are reflected off one or more objects in the light sensing area 711. In other words, upon transmitting the one or more laser beams through the light sensing area 711, the one or more laser beams may be reflected as laser waves by one or more traffic related objects (e.g., motor vehicles, pedestrians, trees, guardrails, etc.) that are located within the light sensing area 711 and are received back at the light sensor 710.

The one or more host image sensors 712a, 712b, 712c, 712d, 712e, and 712f may also be positioned around the host vehicle 400 to capture additional sensor data from the corresponding image sensing areas 713a, 713b, 713c, 713d, 713e, and 713f. The size of the image sensing areas 713a-713f may be defined by the location, range, sensitivity and/or actuation of the one or more host image sensors 712a-712f.

The one or more host image sensors 712a-712f may be disposed at external front and/or side portions of the host vehicle 400, including, but not limited to different portions of the vehicle bumper, vehicle front lighting units, vehicle fenders, and the windshield. The one or more host image sensors 712a-712f may be positioned on a planar sweep pedestal (not shown) that allows the one or more host image sensors 712a-712f to be oscillated to capture images of the external environment of the host vehicle 400 at various angles. Additionally, the one or more host image sensors 712a-712f may be disposed at internal portions of the host vehicle 400 including the vehicle dashboard (e.g., dash mounted camera), rear side of a vehicle rear view mirror, etc.

The sensor data includes the captured sensor data from the at least one sensor of the host vehicle 400. In this example, the sensor data is captured from the light sensing area 711 and the image sensing areas 713a-713f. Therefore, the sensor data is from the sensor area defined by the light sensing area 711 and the image sensing areas 713a-713f.

In addition to sensing objects and the surrounding environment of the host vehicle 400, the sensor data may include vehicle data about the host vehicle 400. The vehicle data can include speed, acceleration, velocity, yaw rate, steering angle, and throttle angle, range or distance data, navigation data, among others. The vehicle data can also include course heading data, course history data, projected course data, kinematic data, current vehicle position data, and any other vehicle information about the remote vehicles and the environment surrounding the remote vehicles.

At block 604, the metadata module 422 generate metadata for the sensor data. The metadata describes the sensor data and may include descriptive metadata, structural metadata, administrative metadata, reference metadata and statistical metadata. To generate the metadata the metadata module 422 may identify the source of the metadata. For example, suppose that a first set of sensor data is received from the light sensor 710 and a second set of sensor data is received from the host image sensor 712a. The metadata module 422 generates metadata that distinguishes between the light sensor 710 and the host image sensor 712a. The metadata may also include timing information such as when the sensor data was captured, the length of the sensor data, the amount of time it took to receive the sensor data, etc. For example, suppose the host image sensor 712a captures sensor data for the image sensing area 713a for a trip. The metadata for the corresponding sensor data may include when the sensor data was captured by the host image sensor 712a, for example, via a timestamp. The length of time that sensor data corresponds to may be, for example, ten minutes of the twenty minute trip. Furthermore, in this example, the amount of time it took to receive the sensor data at the receiving module 420 may be 2 milliseconds (ms) after it was captured by the host image sensor 712a. In this manner, the metadata may be generated based on information from the vehicle sensors 406 and/or the receiving module 420.

The metadata may also be generated based on information from the vehicle systems 404. Returning to the example from above, suppose the host image sensor 712*a* captures sensor data for the image sensing area 713*a* for a roadway such as the roadway environment 800, for example, shown in FIG. 8. The navigation system 436 may provide location and position information corresponding to the image sensing area 713*a*. The metadata, such as the location and position data, may also be generated based on information received from a portable device (not shown) associated with the host vehicle, for example, via a Bluetooth® connection. In another embodiment, the metadata, such as the location and position data, may also be generated based on information received from road side equipment, roadway infrastructure, etc.

The metadata may also include information about the source. For example, the metadata may include the position, orientation, calibration parameters, and capture parameters associated with at least one of the vehicle sensors 406 of the host vehicle 400. For example, the metadata may include information about the position and orientation of the host image sensor 712*a* relative to the host image sensors 712*b*-712*f*. The capture parameters may include the image center, focal length, focal length, distortion model, global or rolling shutter, etc. The metadata may also include information about the size of the received sensor data, for example, from the size of an image from the host image sensor 712*a*. As another example, the metadata about the light sensor 710 may include, for example, a radar pose in a primary camera, a type of tracking mode, a detection threshold, sweep angle, sweep angle uncertainty, and points per scan.

The metadata may also be generated based on analysis of the sensor data by the vehicle systems 404. For example, the light sensor 710 may be configured to receive one or more reflected laser waves (e.g., signals) that are reflected off one or more objects in the light sensing area 711. In other words, upon transmitting the one or more laser beams through the light sensing area 711, the one or more laser beams may be reflected as laser waves by one or more traffic related objects (e.g., motor vehicles, pedestrians, trees, guardrails, etc.) that are located within the light sensing area 711 and are received back at the light sensor 710. The vehicle systems 404 may analyze the sensor data from the light sensor 710 to specify the type of objects, number of objects, etc. sensed in the sensor data. The metadata may also include information about range, luminescence, Doppler analysis, bearing, echo amplitude, range uncertainty, Doppler uncertainty, luminescence uncertainty, and angular resolution of the sensed objects. Thus, the metadata may be generated based on information from multiple sources including the VCD 402, vehicle systems 404, and the vehicle sensors 406 of the host vehicles 400. The metadata may also be generated based on other devices associated with host vehicle 400 such as a portable device or infrastructure devices via a network based, for example, on proximity.

B. Packaging Stage

At block 606, the packet module 424 forms a metadata packet including the metadata and a sensor data packet including the sensor data. The packet module 424 differentiates between types of data and packages the types of data separately. For example, the packet module 424 receives the metadata retrieved and harvested by the metadata module 422 and packages the metadata in the metadata packet. The sensor data may be received from receiving module 420 and/or the vehicle sensors 406, and the packet module 424 packages the sensor data in sensor data packet separate from the from the metadata packet.

Despite the metadata packet and the sensor data packet being packaged separately, the packet module 424 may package the packet similarly. For example, the packet module 424 may formulate the packets based on the communications protocol and delivers the packets to a transmission layer. The communication protocol may be a cellular communications protocol or a sidelink. Suppose that the cellular communications protocol is 5G protocol, the packets may be formed based on the layers of the 5G protocol. Furthermore, the packaging based on the portion of the radio frequency spectrum. For example, the packet module 424 may formulate the packets with compression, data rates, etc. according to the specific part of the radio frequency spectrum to be used by the cellular communications protocol.

Formulating the packets may be based on the type of data being sent. In one embodiment, the metadata packet and/or the sensor data packet may be formed to utilize one or more of multiple-input and multiple-output (MIMO) layers of the network architecture 100. In another embodiment, formulating the packets may include formatting the metadata and/or sensor data according to frames. Suppose that the packet module 424 is forming a metadata packet having one or more frames. The packet module 424 may arrange the metadata into specific frames of the one or more frames based on the layers of the communication protocol being used by the vehicles 101 and 102. For example, spatial multiplexing may be used below 6 GHz, while MIMO is used above 6 GHz.

In one embodiment, a frame of the one or more frames includes a preamble with an identification value that identifies the raw data that the metadata of the metadata packet corresponds to. The remaining portion of the frame of the metadata packet that follows the preamble may be composed of a plurality of sub-frames having the metadata generated and harvested by the metadata module 422. The identification value may also indicate the number of frames of the metadata packet, the number of metadata packets, the size of the frame and/or the metadata packet, when the next frame begins, etc. In another embodiment the identification value may be appended to the one or more frames of the metadata packet. Additionally, the sensor data packet may also include an identification value that corresponds to the identification value of metadata packet and be appended in a similar manner.

C. Transmission Stage

At block 608, the transmission module 426 transmits the metadata packet at a first carrier frequency and the sensor data packet at a second carrier frequency. The transmission module 426 may access the baseband circuitry 204 associated with the cellular communications protocol. The carrier frequencies may be transmitted using different portions of the radio frequency spectrum. For example, the first carrier frequency may be sent in the low or mid band of 5G. In one embodiment, the first carrier frequency is in the sub-6 GHz spectrum (e.g., 600 MHz, 3100-3550 MHz, 3700-4200 MHz, etc.). Conversely, the second carrier frequency may be sent in high band of 5G, such as mmWave between 24 GHz and 100 GHz (e.g., 27.5-28.35 GHz, 37-40 GHz, 64-71 GHz, etc.).

In some embodiments, the transmission module 426 may select the first carrier frequency and the second carrier frequency based on communication parameters, such as the licensing of the spectrum, development of infrastructure, bandwidth supports by the frequency, etc. For example, mmWave is an unlicensed range of the spectrum that offers a larger amount of bandwidth. Accordingly, mmWave may be selected for the second carrier frequency due to the size of the sensor data packet. Conversely, the sub-6 GHz spectrum may be used over a wide area and licensed for use by vehicles 101 and 102, and accordingly, can be used for direct communications.

Because the transmission module 426 uses different carrier frequencies for different types of data, the carrier frequencies may be sent via varying beam paths. Turning to the roadway environment 800 of FIG. 8, suppose that a metadata packet and a sensor data packet are being transmitted from the host vehicle 400 to a remote vehicle 802. The receiving module 420 of the host vehicle 400 may receive sensor data and corresponding metadata from the light sensor 710 and/or one or more host image sensors 712a, 712b, 712c, 712d, 712e, and 712f. The remote vehicle 802 may have similarly situated sensors. For example, the remote vehicle 802 may have a remote sensor 804 that functions in a similar manner as the light sensor 710 described above. The receiving module 420 may also receive sensor data and corresponding metadata from roadway infrastructure, such as street light 806. In this manner, the host vehicle 400 may receive sensor data and/or metadata directly from the roadway environment 800.

Continuing the example from above, suppose the first carrier frequency is in the sub-6 GHz spectrum and the second carrier frequency is in the mmWave spectrum. While both frequencies make use of a 5G network, the first carrier frequency may be routed through a base station 808 in a first leg 810 and a second leg 812 opposed to the second carrier frequency which may use direct path 814 communication. Because the beaming can be complicated by high mobility situations, the base station 808 may provide beam training information to the vehicles participating in providing a data flow for sensor sharing, as will be described in the example given below.

Figure 9:
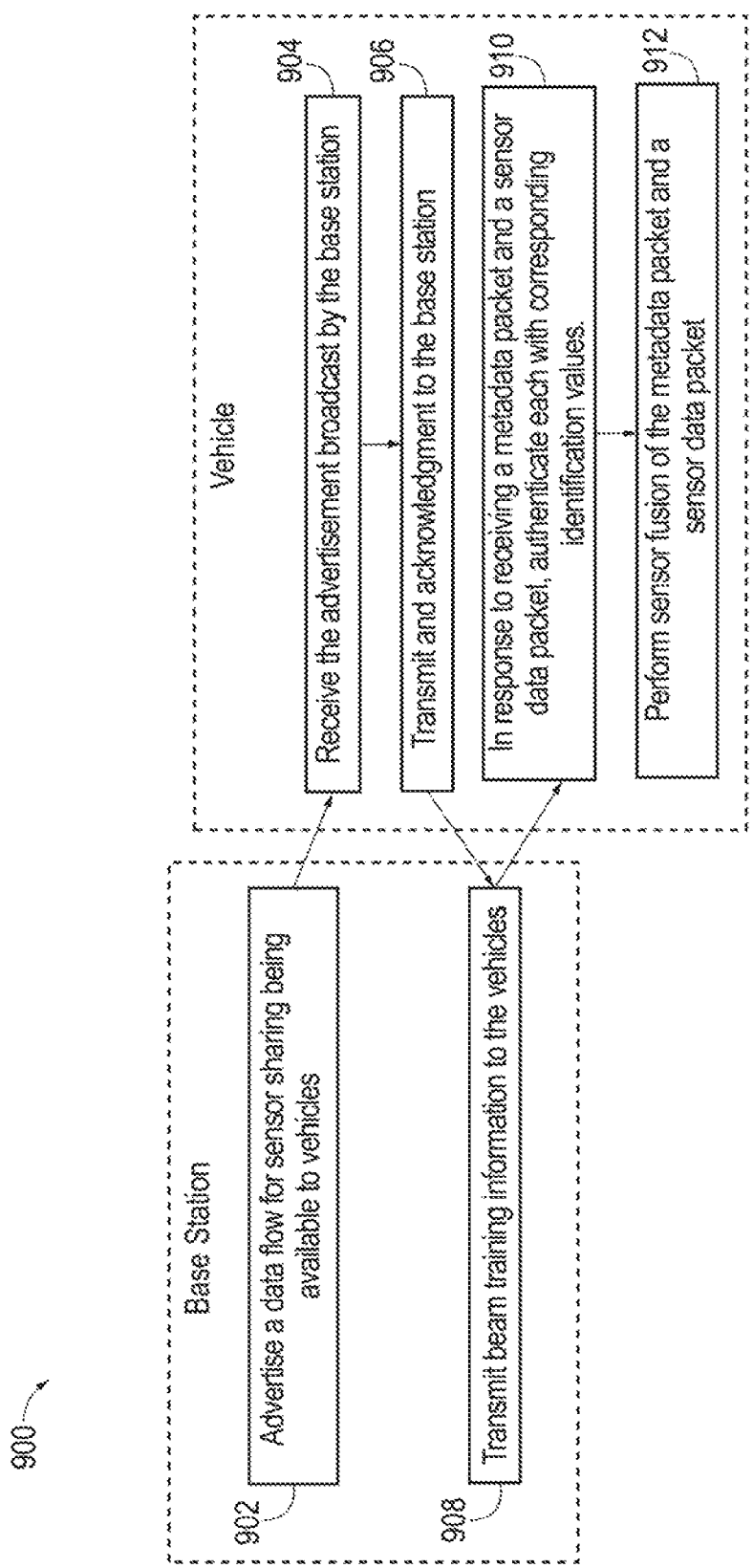
FIG. 9 is a flow diagram illustrating an example for advertising a data flow for sensor sharing, according to various aspects described herein.

FIG. 9 is a flow diagram illustrating an example for advertising a data flow for sensor sharing, according to various aspects described herein. At block 902, the base station 808 may advertise 816 that providing a data flow for sensor sharing is available to vehicles, such as the host vehicle 400 and the remote vehicle 802, in the roadway environment 800. The processor(s) 510 of the base station 808 may configured to generate and transmit the advertisement 816. The advertisement 816 may include a minimum communication standard needed to participate. For example, the minimum communications may include network capability, such as 5G capability, hardware requirements, minimum sensing capability, etc. In another embodiment, the minimum communication standard may be based on the manner in which the vehicle is driven, the manufacturer of the vehicle, membership in a group, etc.

One or more vehicles of the roadway environment 800 receive the advertisement 816 at the receiving module 420. While any number of vehicles may receive the advertisement 816, the example described herein will be discussed with regard to the host vehicle 400. Accordingly, at block 904, the host vehicle 400 receives the advertisement 816 broadcast by the base station 808. In response to receiving the advertisement 816, the transmission module 426 of the host vehicle 400, if capable of participating, transmits an affirmative response to the base station 808 at block 906

The affirmative response may include an acknowledgement of the minimum communication standard and may include details on the manner in which the host vehicle 400 satisfies the minimum communication standard. For example, suppose the minimum communication standard requires that the host vehicle have a threshold amount of sensor coverage. The acknowledgment may include a sensor map that details the light sensing area 711 and image sensing areas 713a, 713b, 713c, 713d, 713e, and 713f. The acknowledgment may also include path planning information, such as route and destination information, vectoring, turn-by-turn directions, global positioning system (GPS) information, etc. from, for example, the navigation system 436.

At block 908, the base station 808 provides the host vehicle beam training information to the host vehicle 400 based on the path planning information. The beam training information includes directional informational that the one or more of the vehicles, such as the host vehicle 400, can use to communicate. In particular, the directional information indicates where the carrier frequency should be directed to based on where a vehicle will be. Thus, even though vehicles present a high mobility scenario, the carrier frequencies can be transmitted based on the predicted location of a vehicle. The beam training information may also include network information with regard to the network architecture 100, such as what baseband circuitry, carrier frequency, channel, etc. to use for providing the data flow for sensor sharing. Accordingly, the base station 808 may set and transmit the communication parameters to the participating vehicles to enable communication.

The vehicles can then provide the for providing a data flow for sensor sharing, according to various aspects described herein, for example, with respect to FIG. 6. In response to receiving the metadata packet and the sensor data packet, at block 910, each of the metadata packet and the sensor data packet may be authenticated with corresponding identification values. For example, the packet module 424 may compare the identification values for the metadata packet and a sensor data packet to determine if the identification values match or reference one another, the metadata packet, and/or the sensor data packet. In this manner, the metadata packet and/or the sensor data packet can be authenticated to protect the vehicles from spoofing, hacking, etc.

At block 912, sensor fusion of the metadata packet and a sensor data packet is performed by the packet module 424 in response to the metadata packet and/or the sensor data packet being authenticated. In sensor fusion, the metadata packet and the sensor data packet are correlated such that the metadata of the metadata packet corresponds to the raw sensor data of the sensor data packet. Furthermore, suppose that the remote vehicle 802 receives and authenticates the metadata packet and the sensor data packet, the packet module 424 of the remote vehicle 802 may fuse the sensor data from the vehicle sensors 406 of the remote vehicle 802 with information from the sensor data of the sensor data packet. In this manner, vehicles, such as the host vehicle 400 and the remote vehicle 802 can take advantage of different spectra to provide a data flow for sensor sharing.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. An apparatus configured to be employed in a host vehicle comprising:
   a memory; and
   a processor including:
   a receiving module, implemented via the processor, configured to receive sensor data from at least one vehicle sensor of the host vehicle;
   a metadata module, implemented via the processor, configured to generate metadata for sensor data;
   a packet module, implemented via the processor, configured to form a metadata packet including the metadata and a sensor data packet including the sensor data; and
   a transmission module, implemented via the processor, configured to transmit the metadata packet at a first carrier frequency that is in a sub-6 GHz spectrum and the sensor data packet at a second carrier frequency that is in a mmWave spectrum different than the first carrier frequency.

2. The apparatus of claim 1, wherein the metadata includes one or more of a position of the at least one vehicle sensor, orientation of the at least one vehicle sensor, calibration parameters of the at least one vehicle sensor, and capture parameters of the at least one vehicle sensor.

3. The apparatus of claim 1, wherein the metadata packet and the sensor data packet include beam training information.

4. The apparatus of claim 1, wherein the sensor data packet is formed to utilize one or more of multiple-input and multiple-output (MIMO) layers of a fifth generation (5G) new radio (NR) network.

5. The apparatus of claim 1, wherein the metadata packet and the sensor data packet include an identification value for authentication.

6. The apparatus of claim 1, wherein the first carrier frequency and the second carrier frequency are set by a base station in communication with the host vehicle.

7. An apparatus configured to be employed in a host vehicle comprising:
   a memory; and
   a processor including:
   a receiving module, implemented via the processor, configured to receive sensor data from at least one vehicle sensor of the host vehicle;
   a metadata module, implemented via the processor, configured to generate metadata for sensor data;
   a packet module, implemented via the processor, configured to form a metadata packet including the metadata and a sensor data packet including the sensor data; and
   a transmission module, implemented via the processor, configured to transmit the metadata packet at a first carrier frequency that is in a sub-6 GHz spectrum and the sensor data packet at a second carrier frequency that is in a mmWave spectrum different than the first carrier frequency, wherein the first carrier frequency and the second carrier frequency are set by a base station in communication with the host vehicle.

8. The apparatus of claim 7, wherein the metadata packet and the sensor data packet include beam training information.

9. A computer implemented method for providing a data flow for sensor sharing with a host vehicle, the method comprising:
   receiving sensor data from at least one vehicle sensor of the host vehicle;
   generating metadata for sensor data;
   forming a metadata packet including the metadata and a sensor data packet including the sensor data; and
   transmitting the metadata packet at a first carrier frequency in a sub-6 GHz spectrum and the sensor data packet at a second carrier frequency in a mmWave spectrum different than the first carrier frequency.

10. The computer implemented method of claim 9, wherein the metadata includes one or more of a position of the at least one vehicle sensor, orientation of the at least one vehicle sensor, calibration parameters of the at least one vehicle sensor, and capture parameters of the at least one vehicle sensor.

11. The computer implemented method of claim 9, wherein frequencies of the first carrier frequency and the second carrier frequency are set by a base station in communication with the host vehicle.

12. The computer implemented method of claim 9, wherein the metadata packet and the sensor data packet include beam training information.

13. The computer implemented method of claim 9, wherein the sensor data packet is formed to utilize one or more multiple-input and multiple-output (MIMO) layers of a fifth generation (5G) new radio (NR) network.

14. The computer implemented method of claim 9, wherein the metadata packet and the sensor data packet include an identification value for authentication.

15. An apparatus configured to be employed in a host vehicle comprising:
   a memory; and
   a processor including:
   a receiving module, implemented via the processor, configured to receive sensor data from at least one vehicle sensor of the host vehicle;
   a metadata module, implemented via the processor, configured to generate metadata for sensor data;
   a packet module, implemented via the processor, configured to form a metadata packet including the metadata and a sensor data packet including the sensor data; and
   a transmission module, implemented via the processor, configured to transmit the metadata packet at a first carrier frequency in a sub-6 GHz spectrum and the sensor data packet at a second carrier frequency in a mmWave spectrum.

16. The apparatus of claim 15, wherein the metadata includes one or more of a position of the at least one vehicle sensor, orientation of the at least one vehicle sensor, calibration parameters of the at least one vehicle sensor, and capture parameters of the at least one vehicle sensor.

17. The apparatus of claim 15, wherein frequencies of the first carrier frequency and the second carrier frequency are set by a base station in communication with the host vehicle.

18. The apparatus of claim 15, wherein the metadata packet and the sensor data packet include beam training information.

19. The apparatus of claim 15, wherein the sensor data packet is formed to utilize one or more multiple-input and multiple-output (MIMO) layers of the 5G associated spectra.

* * * * *